United States Patent
Sun et al.

(10) Patent No.: US 10,072,663 B2
(45) Date of Patent: Sep. 11, 2018

(54) VARIABLE-SPEED MULTI-STAGE REFRIGERANT CENTRIFUGAL COMPRESSOR WITH DIFFUSERS

(75) Inventors: Lin Sun, Tallahassee, FL (US); Joost Brasz, Fayetteville, NY (US); Mogens Rasmussen, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 487 days.

(21) Appl. No.: 14/373,712

(22) PCT Filed: Jan. 23, 2012

(86) PCT No.: PCT/US2012/022159
§ 371 (c)(1),
(2), (4) Date: Jul. 22, 2014

(87) PCT Pub. No.: WO2013/112122
PCT Pub. Date: Aug. 1, 2013

(65) Prior Publication Data
US 2014/0356138 A1 Dec. 4, 2014

(51) Int. Cl.
*F04D 17/12* (2006.01)
*F04D 27/00* (2006.01)
(Continued)

(52) U.S. Cl.
CPC ........... *F04D 17/12* (2013.01); *F04D 17/122* (2013.01); *F04D 27/002* (2013.01); *F04D 27/0261* (2013.01); *F04D 29/462* (2013.01); *F04D 29/464* (2013.01); *F25B 1/00* (2013.01); *F04D 17/14* (2013.01); *F05D 2250/52* (2013.01); *F25B 1/053* (2013.01); *F25B 1/10* (2013.01);
(Continued)

(58) Field of Classification Search
CPC ........ F04D 17/12; F04D 17/122; F04D 17/14; F04D 27/0261; F04D 27/002; F04D 29/462; F04D 29/464; F04D 27/0246; F04D 29/442; F04D 29/444; F05B 2270/101; F25B 1/10; F25B 1/053; F25B 2600/0253
See application file for complete search history.

(56) References Cited

U.S. PATENT DOCUMENTS

| | | | | |
|---|---|---|---|---|
| 4,145,875 A | * | 3/1979 | Liddle | F01D 17/143 60/39.25 |
| 4,378,194 A | * | 3/1983 | Bandukwalla | F01D 17/143 415/146 |

(Continued)

FOREIGN PATENT DOCUMENTS

EP 0622549 A1 11/1994
JP 2007211716 A 8/2007

OTHER PUBLICATIONS

International Search Report and Written Opinion dated Apr. 7, 2014 for International Application PCT/US 12/22159.
(Continued)

*Primary Examiner* — Igor Kershteyn
*Assistant Examiner* — Brian P Wolcott
(74) *Attorney, Agent, or Firm* — Carlson, Gaskey & Olds, P.C.

(57) ABSTRACT

A refrigeration system includes a chiller having a refrigerant loop. A compressor is part of and in fluid communication with the refrigerant loop. The compressor has two stages, one with a variable geometry diffuser and one with a fixed geometry diffuser.

8 Claims, 6 Drawing Sheets

(51) Int. Cl.
F04D 27/02 (2006.01)
F04D 29/46 (2006.01)
F25B 1/00 (2006.01)
F04D 17/14 (2006.01)
F25B 1/053 (2006.01)
F25B 1/10 (2006.01)

(52) U.S. Cl.
CPC ..... F25B 2600/0253 (2013.01); Y02B 30/741 (2013.01)

(56) References Cited

U.S. PATENT DOCUMENTS

| | | | |
|---|---|---|---|
| 4,824,325 A * | 4/1989 | Bandukwalla | F04D 29/444 415/208.4 |
| 4,877,369 A | 10/1989 | Bandukwalla | |
| 5,730,580 A * | 3/1998 | Japikse | F01D 17/16 415/208.1 |
| 5,899,661 A | 5/1999 | Sishtla et al. | |
| 2002/0014088 A1 | 2/2002 | Seki et al. | |
| 2005/0223737 A1 | 10/2005 | Conry | |
| 2007/0204615 A1 | 9/2007 | Vrbas | |
| 2009/0196741 A1* | 8/2009 | Tsukamoto | F04D 17/122 415/159 |
| 2009/0205360 A1 | 8/2009 | Haley et al. | |
| 2010/0215489 A1* | 8/2010 | Johnson | F04D 29/444 415/208.2 |
| 2011/0038737 A1 | 2/2011 | Conry et al. | |
| 2011/0150628 A1* | 6/2011 | Wagner | F04D 29/048 415/1 |

OTHER PUBLICATIONS

The Supplementary European Search Report for U.S. Appl. No. 14/373,712, dated Feb. 19, 2016.
International Preliminary Report on Patentability for International Application No. PCT/US2012/022159 dated Aug. 7, 2014.
Supplementary Partial European Search Report for European Application No. 12866468.7 dated Nov. 4, 2015.

* cited by examiner

VARIABLE-SPEED MULTI-STAGE REFRIGERANT CENTRIFUGAL COMPRESSOR WITH DIFFUSERS

BACKGROUND

This disclosure relates to a centrifugal compressor for use in a refrigeration system and, in particular, to a variable-speed, multi-stage centrifugal compressor having at least one vaned diffuser.

Existing single-stage and two-stage centrifugal refrigeration compressors, with vaneless or vaned diffusers, typically have at least one set of variable inlet guide vanes at a compressor inlet to regulate compressor capacity during various operating conditions.

Variable-speed centrifugal compressors use speed variation as their primary capacity control mechanisms, but such compressors still need variable inlet guide vanes in order to operate surge-free at low capacity conditions.

Multi-stage centrifugal compressors have used stages with fixed, typically vaneless, diffusers with inlet guide vanes and variable speed as the capacity control mechanism. Single-stage refrigerant compressors have been introduced that employ a variable frequency drive (VFD) for capacity control in addition to a set of rotatable inlet guide vanes upstream of the impeller. In the case of a variable speed capability, a variable-geometry diffuser has been used downstream from the impeller to improve the compressor surge characteristics at part-load operating conditions.

SUMMARY

A refrigeration system includes a chiller having a refrigerant loop. A compressor is in fluid communication with the refrigerant loop. The compressor has first and second compressor stages with a variable geometry diffuser and a fixed diffuser respectively arranged downstream from the first and second stage impellers.

In one example, the compressor includes a housing having a first stage inlet and outlet and a second stage inlet and outlet. First- and second-stage impellers are arranged in the housing with the first-stage impeller arranged fluidly between the first-stage inlet and outlet and the second-stage impeller arranged fluidly between the second-stage inlet and outlet. First and second-stage diffusers are arranged in the housing with the first-stage diffuser arranged fluidly between the first-stage impeller outlet and the second compressor inlet. The second-stage diffuser is arranged fluidly downstream from the second-stage impeller. The first- and second-stage diffusers are different from each other, and one of the diffusers is geometrically variable.

BRIEF DESCRIPTION OF THE DRAWINGS

The disclosure can be further understood by reference to the following detailed description when considered in connection with the accompanying drawings wherein.

Like numerals in the Figures may be used to indicate like elements.

DETAILED DESCRIPTION

Figure 1:
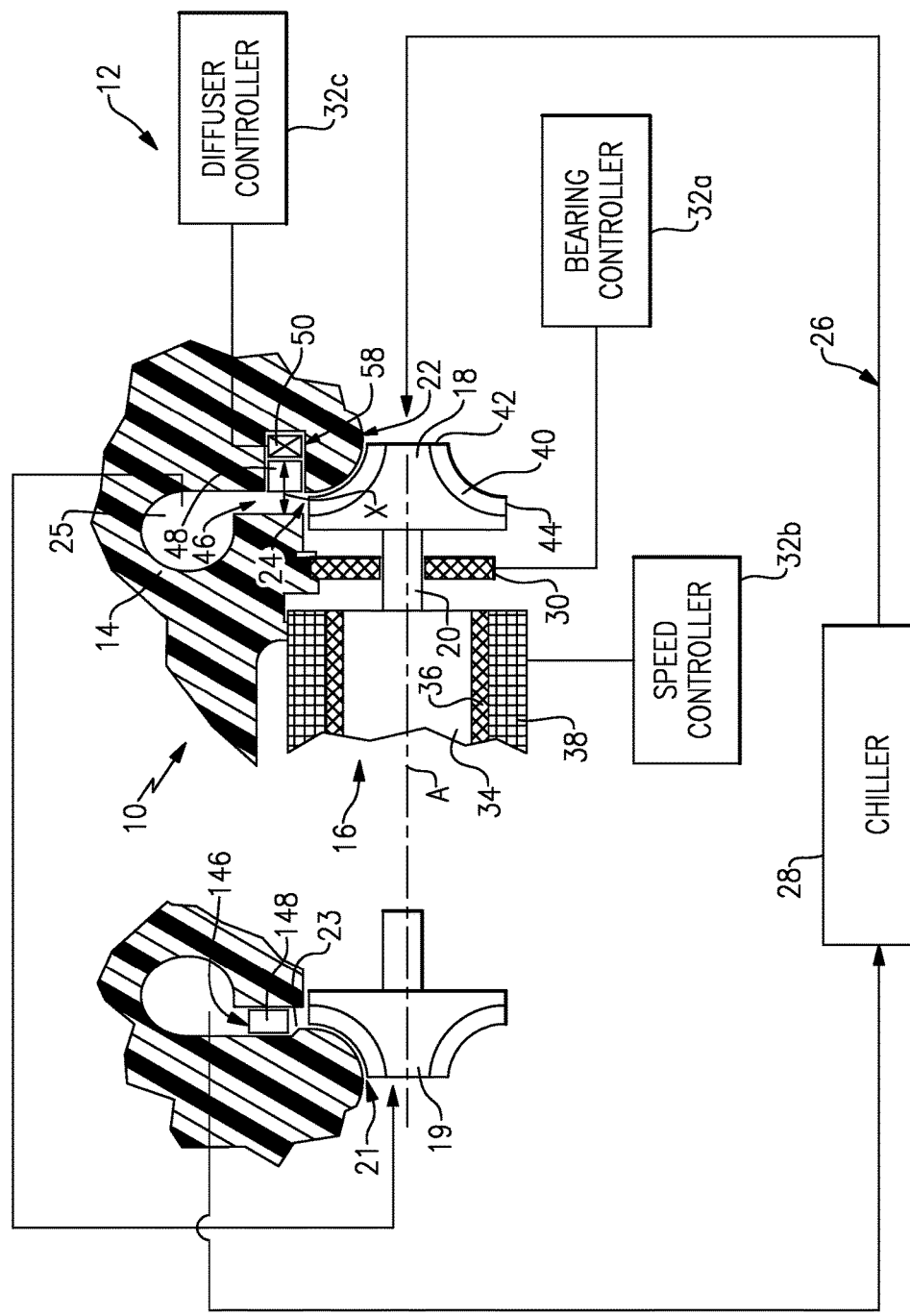
FIG. 1 is a highly schematic view of a refrigerant system having an example refrigerant compressor with multiple stages.

Referring to FIG. 1, a refrigeration system 12 includes a refrigerant compressor 10 for circulating a refrigerant. The refrigerant compressor 10 includes a housing 14 within which an electric motor 16 is arranged. The housing 14 is schematically depicted and may comprise one or more pieces. The electric motor 16 rotationally drives first and second impellers 18, 19 via a rotor shaft 20 about an axis A to compress the refrigerant in a two-stage compressor configuration. The rotor shaft 20 may comprise one or more pieces.

Figure 2:
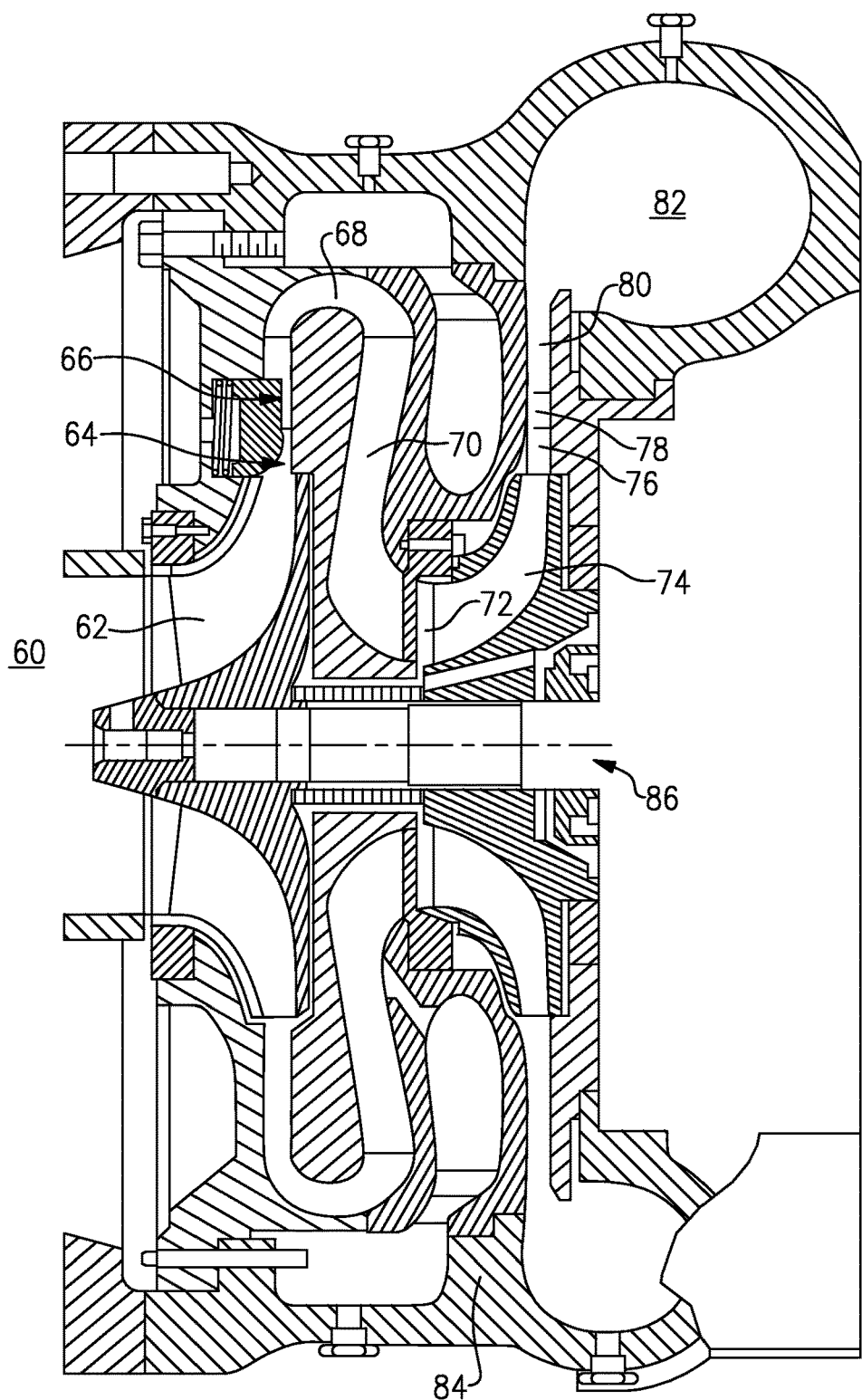
FIG. 2 is a cross-section in the meridional plane of the fluid path of the two-stage refrigeration compressor of this disclosure.

Although two compressor stages are shown, the disclosure may also be used in a compressor having more stages. In the example shown, the first and second impellers 18, 19 are located on opposing ends of the rotor shaft 20, although the impellers may be located adjacent to one another (as shown in FIG. 2). In the example illustrated in FIG. 1, the compressor contains the impeller 18, which is centrifugal. That is, the impeller inlet is arranged axially, and the impeller outlet is arranged radially. Referring to the first impeller 18 for example, each impeller includes blades 40 that extend from an inlet end 42 generally radially outwardly along an arcuate path to an outlet end 44.

The first impeller 18 includes a first compressor inlet 22 and a first compressor outlet 24. The second impeller 19 includes a second compressor inlet 21 and a second compressor outlet 23. The first and second impellers 18, 19 are in fluid communication with a refrigerant loop 26 that circulates the refrigerant to a load, such as a chiller 28. The refrigerant loop 26 includes a condenser, an evaporator, and an expansion device (not shown).

In the arrangement shown, refrigerant is received at the first compressor stage by the first compressor inlet 22 and compressed by the first impeller 18 before being expelled by the first compressor outlet 25. Compressed refrigerant is sent to the second compressor inlet 21 of the second compressor stage and further compressed by the second impeller 19. The further compressed refrigerant is provided to the chiller 28 where it is condensed, expanded and evaporated before being returned to the first compressor stage.

An oil-free bearing arrangement is provided for support of the rotor shaft 20 so that oil-free refrigerant can be used in the refrigerant chiller 28. In the example, the rotor shaft 20 is rotationally supported relative to the housing 14 by a magnetic bearing 30, which is illustrated in a highly schematic fashion. The magnetic bearing 30 may include radial and/or axial magnetic bearing elements, for example. A bearing controller 32a communicates with the magnetic bearing 30 providing a magnetic bearing command to energize the magnetic bearing 30. The magnetic bearing creates a magnetic field levitating the rotor shaft 20 and controls its characteristics during operation of the refrigerant compressor 10. It should be understood that the disclosed compressor arrangements can also be used with air bearings or other types of bearings.

The electric motor 16 includes a rotor 34 supporting multiple magnets 36 about its circumference in one example. A stator 38 is arranged about the rotor 34 to impart rotational drive to the rotor shaft 20 when energized. In one example, a motor controller 32b communicates with the stator 38 and provides a variable speed command to rotationally drive the impellers 18 and 19 at a variable speed depending upon compressor operating conditions. The motor controller 32b communicates with multiple sensors (not shown) to monitor and maintain the compressor operating conditions.

The housing 14 includes an upstream region at the first compressor inlet 22, which has typically contained variable inlet guide vanes in the prior art. The refrigerant compressor 10 does not utilize variable inlet guide vanes at the upstream region in the illustrated embodiment. Instead, a first diffuser, which is a variable geometry diffuser 48, is provided downstream from the first compressor outlet 24 to regulate the flow and pressure across the first impeller 18 without the need for or use of inlet guide vanes. A fixed geometry vaned diffuser 148 is provided in a passage 146 of the second stage compressor.

Figure 3A:
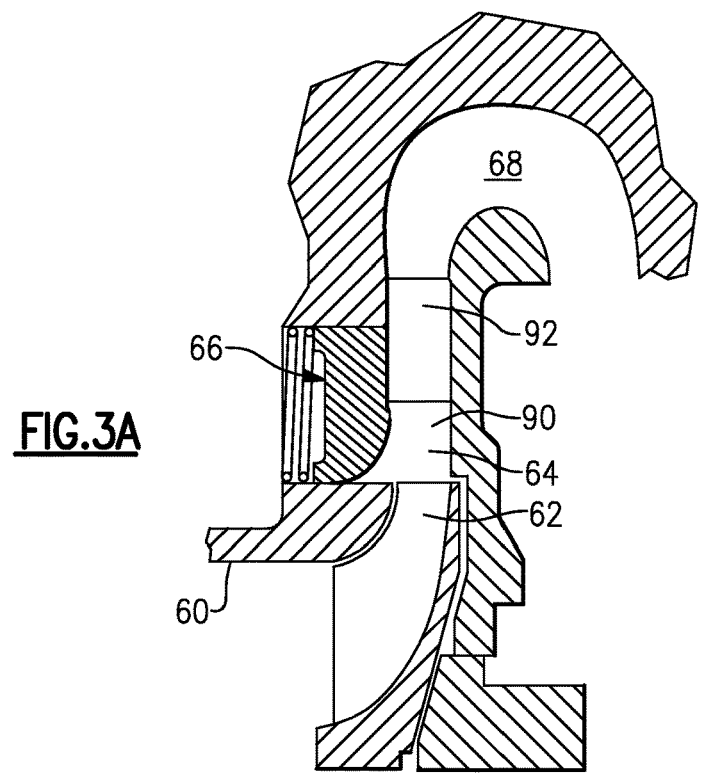
FIG. 3A is an enlarged, cross-sectional view in the meridional plane of one example movable-wall variable-geometry diffuser in a generally unrestricted condition.
Figure 3B:
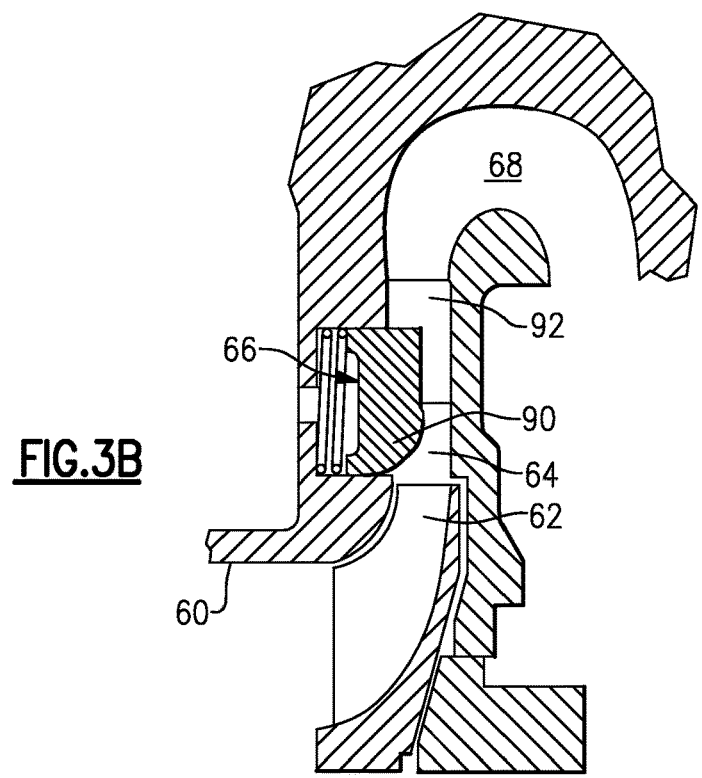
FIG. 3B is an enlarged, cross-sectional view in the meridional plane of the example movable-wall variable-geometry diffuser shown in FIG. 3A in a restricted condition.

The impeller outlet 24 includes a passage 46 having a throat, which is the smallest cross-sectional flow area, immediately adjacent to the outlet end 44. The passage 46 extends to a first compressor outlet 25, which in this example is a volute. In the example shown, the variable geometry diffuser 48 is provided at the throat and aligned with at least a portion of the impeller 18 radially outward of the outlet end 44. In one example, the passage 46 is without additional structures or vanes, providing a "vaneless" diffuser in a downstream region 64 between the variable geometry diffuser 48 and the first compressor outlet 25. A movable ring variable geometry vaned diffuser arrangement is depicted in FIGS. 3A-3B. Different variable geometry arrangements using vanes also may be used in the refrigerant system 12.

An actuator 50 is provided in a cavity 58 of the housing 14, for example, to move the variable geometry diffuser 48 between unrestricted (FIG. 3A) and restricted (FIG. 3B) conditions. The actuator 50 may also be used to move other types of variable diffusers.

Centrifugal compressor efficiency can be improved by 4-7% by replacing a vaneless diffuser with a discrete-passage diffuser. Examples of discrete passage diffusers are single-thickness-vane diffusers, air-foil-vane diffusers, vane-island diffusers and pipe diffusers. Following the common turbomachinery nomenclature we will refer to all these different types of discrete passage diffusers as vaned diffusers. Since vaned diffusers are more sensitive to flow angle variations than vaneless diffusers, their efficiency improvement is offset by a reduction in the stable operating range of the compressor causing early surge at part-load conditions.

Referring to FIG. 2 and following the direction of the compressed flow, the fluid path of another type of two-stage compressor consists of a compressor inlet section 60, a first stage impeller 62 followed by a short vaneless diffuser 64, a variable geometry vaned diffuser 66, a cross-over bend 68 and a return channel 70, a second stage inlet 72, a second stage impeller 74, a second-stage short vaneless diffuser 76, a fixed low-solidity vaned diffuser 78, a second vaneless diffuser 80 and finally a flow collecting volute 82 followed by an exit cone diffuser 84. All these elements are contained in a compressor housing 86. The two impellers are the compressor elements mounted on the shaft 20 driven by a motor (not shown) and rotating at high speed, thus transferring the energy to the fluid required for its compression.

Although two compressor stages are shown in FIG. 2, the disclosure may also be used in a compressor having more stages.

In the example shown, the first and second impellers 62 and 74 are located adjacent to each other (the so-called in-line two-stage compressor configuration). For direct-drive gearless multistage compressors the impellers might also be on opposing ends of the rotor shaft (the so-called back-to-back configuration as shown in FIG. 1) reducing the axial thrust load of the shaft.

Figure 3C:
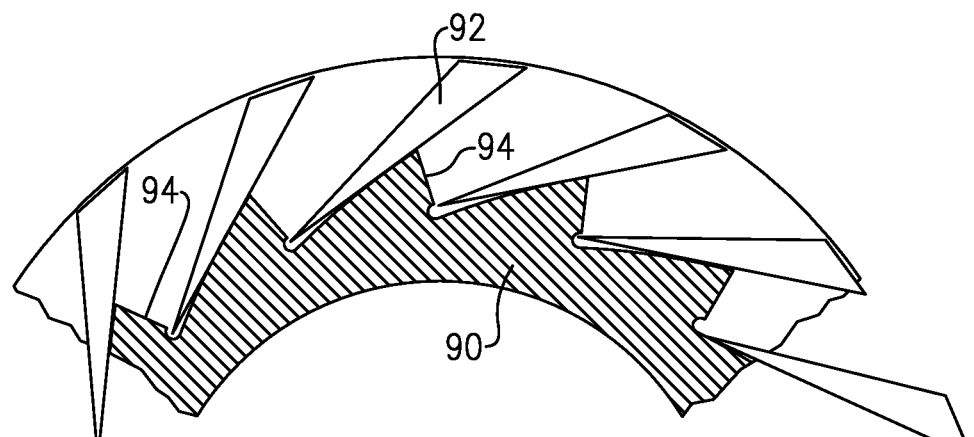
FIG. 3C is a cross-sectional view in the plane normal to the compressor axis of another example movable wall variable geometry diffuser.

FIG. 3A is an enlarged, cross-sectional view in the meridional plane of one of the possible movable-wall variable-geometry diffuser concepts in a generally unrestricted condition. FIG. 3B shows the same diffuser in a restricted condition. From FIG. 3C, a cross-sectional view of this diffuser in the plane normal to the compressor axis, it can be seen that the diffuser includes a plurality of fixed wedge shaped vanes 92 located downstream of the movable diffuser wall element 90. The movable wall element in this example is serrated with the trailing edge of the serration 94 overlapping with the throat area (which is the smallest cross-sectional flow passage) of the vaned diffuser.

Figure 4:
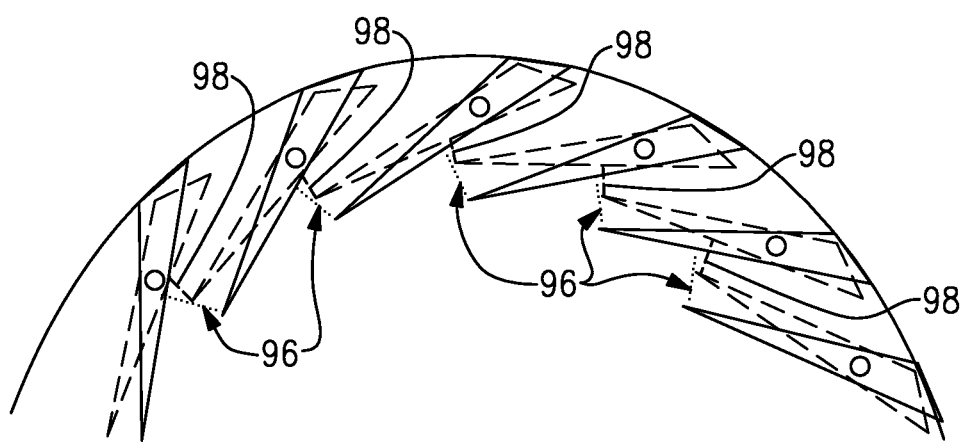
FIG. 4 is a schematic cross-sectional view in a plane normal to the compressor axis of rotation of a fixed-wall rotatable-vane variable-geometry diffuser.

FIG. 4 shows a cross-sectional view of a rotatable vane diffuser in the plane normal to the compressor axis. By rotating the vanes the throat area of the diffuser changes. The vanes drawn in solid lines exhibit a larger throat area 96 than the throat area 98 of the vanes drawn with dashed lines. By rotating the individual vanes, the throat area of the diffuser, and, therefore, the capacity of the compressor, is adjusted.

Figure 5A:
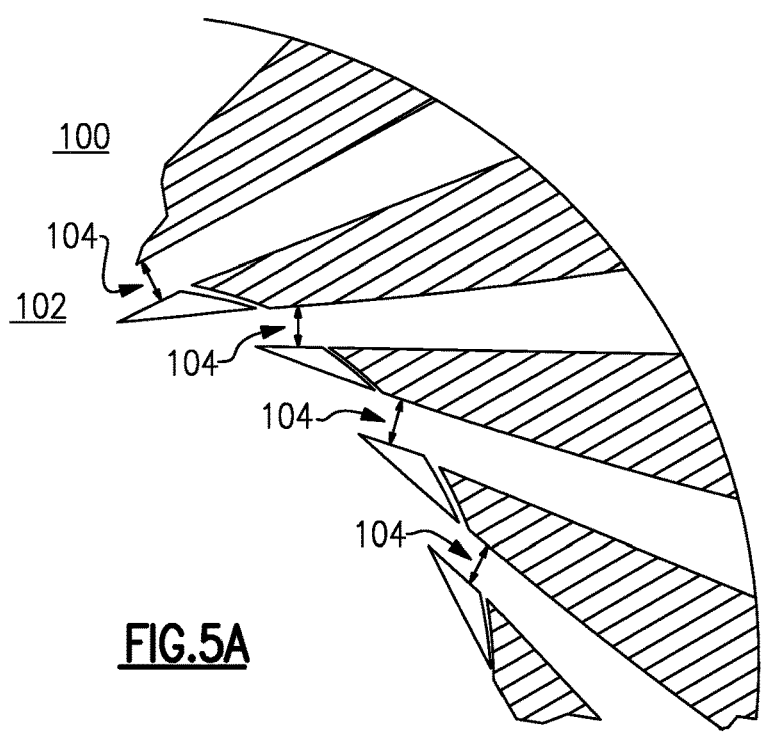
FIG. 5A is a schematic cross-sectional view in a plane normal to the compressor axis of rotation of a variable-geometry split vaned diffuser in a generally unrestricted condition.
Figure 5B:
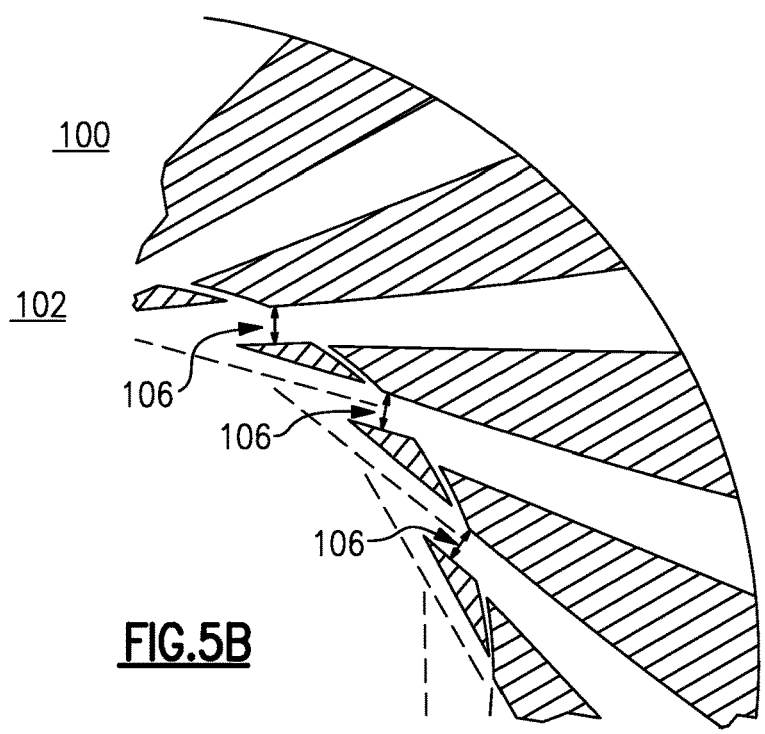
FIG. 5B is a schematic cross-sectional view in a plane normal to the compressor axis of rotation of a variable-geometry split vaned diffuser shown in FIG. 5A in a generally restricted condition.

FIGS. 5A and 5B show a cross sectional view of a split vaned diffuser having an outer diffuser ring 100 and an inner diffuser ring 102. Throat area adjustment is obtained by rotating one diffuser ring with respect to the other one. Throat area 104 of the fully opened diffuser is shown in FIG. 5A while FIG. 5B shows how the throat area 106 is reduced as a result of the rotation of the inner diffuser ring relative to the outer diffuser ring.

Figure 6:
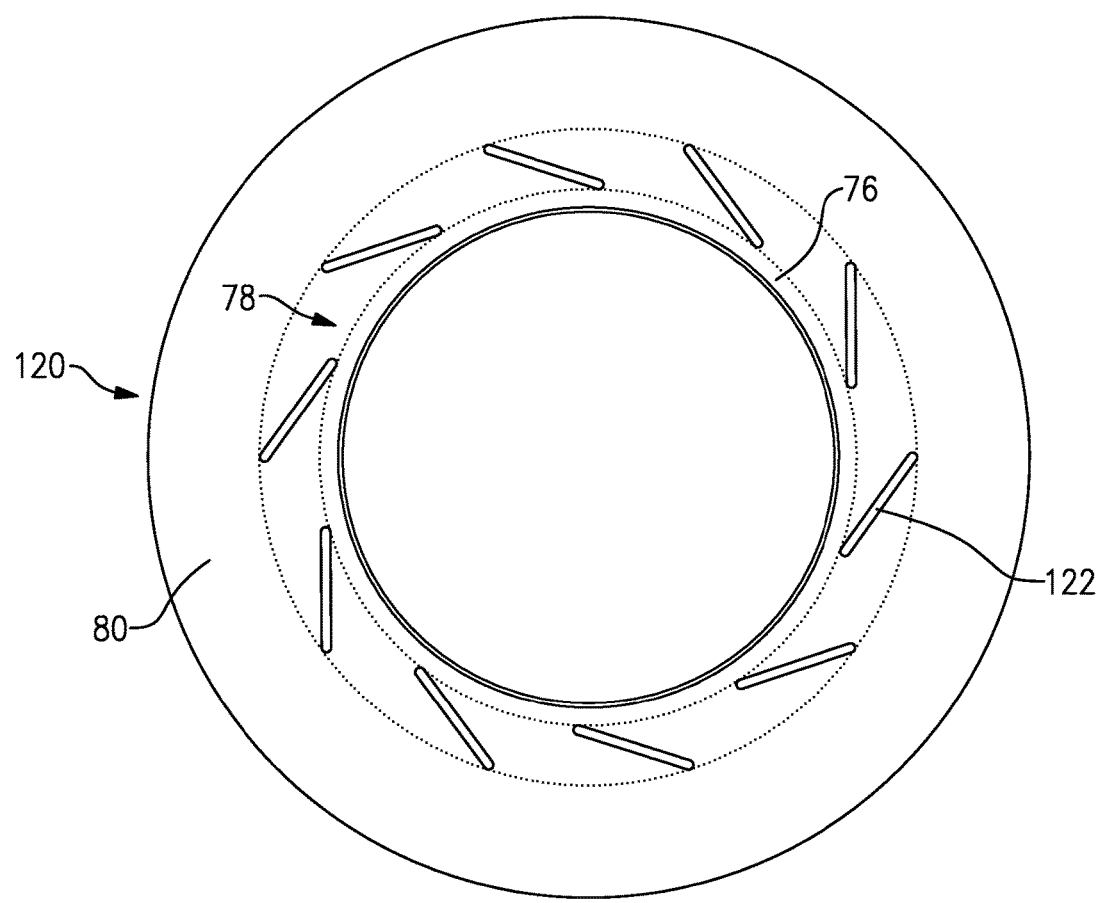
FIG. 6 is a schematic view of a low solidity fixed vaned diffuser.

FIG. 6 shows a cross-sectional view of low solidity fixed diffuser 120 consisting of a vaneless section 76 upstream of the low solidity vanes, the a low solidity vaned diffuser section 78 with individual vanes 122 and the downstream vaneless section 80 located between the trailing edges of the low solidity vanes and the inlet of the volute (see also the axial/radial cross-section in FIG. 2). LSVD configurations lack a geometrical throat in the diffuser passage. One suitable type of LSVD arrangement includes 10 vanes having a solidity of 0.7, starting at a diameter which is 11% larger than the impeller tip diameter.

The disclosed compressor provides a variable speed multistage compressor having off-design efficiency improvements and better surge characteristics than rotatable inlet guide vanes arrangements.

Although example embodiments have been disclosed, a worker of ordinary skill in this art would recognize that certain modifications would come within the scope of the claims. For that reason, the following claims should be studied to determine their true scope and content.

What is claimed is:

1. A refrigerant centrifugal compressor comprising:
a housing comprising a first compressor inlet and outlet and a second compressor inlet and outlet;
first and second impellers arranged in the housing with the first impeller arranged fluidly between the first compressor inlet and outlet and the second impeller arranged fluidly between the second compressor inlet and outlet; and
first and second diffusers arranged in the housing with the first diffuser arranged fluidly between an outlet of the first impeller and the second compressor inlet, and the second diffuser arranged fluidly downstream from an outlet of the second impeller, the first and second diffusers being different from one another, wherein the first diffuser is geometrically variable and the second diffuser is geometrically fixed, and wherein the first diffuser includes a plurality of fixed wedge-shaped vanes located fluidly downstream of a moveable diffuser wall element, the plurality of wedge-shaped vanes tapered such that a width dimension of the plurality of wedge-shaped vanes gradually decreases from a trailing edge to a leading edge thereof, the moveable diffuser wall element being serrated with trailing edges of serration overlapping a throat area of the first diffuser; and wherein the refrigerant centrifugal compressor does not utilize variable inlet guide vanes upstream of the first impeller.

2. The refrigerant centrifugal compressor according to claim 1, wherein vanes of the second diffuser are low solidity vanes, and wherein the trailing edge over leading edge radius ratio of the low solidity vanes is less than 1.2.

3. The refrigerant centrifugal compressor according to claim 2, wherein a solidity of the second diffuser is less than 0.9.

4. The refrigerant centrifugal compressor according to claim 1, comprising magnetic bearings supporting a rotor shaft, and a bearing controller configured to command the magnetic bearings in response to a bearing command for magnetically supporting the rotor shaft.

5. The refrigerant centrifugal compressor according to claim 1, wherein the throat area of the first diffuser is a smallest cross-sectional flow passage between the wedge-shaped vanes.

6. A refrigeration system comprising:
a chiller having a refrigerant loop; and
a compressor in fluid communication with the refrigerant loop, the compressor having first and second compressor stages having first and second impellers, respectively, the first and second compressor stages further having first and second diffusers, respectively, wherein the first diffuser is arranged fluidly between an outlet of the first impeller and an inlet of the second impeller, and the second diffuser is arranged fluidly downstream from an outlet of the second impeller, wherein the first diffuser is geometrically variable and the second diffuser is geometrically fixed, and wherein the first diffuser includes a plurality of fixed wedge-shaped vanes located fluidly downstream of a moveable diffuser wall element, the plurality of wedge-shaped vanes tapered such that a width dimension of the plurality of wedge-shaped vanes gradually decreases from a trailing edge to a leading edge thereof, the moveable diffuser wall element being serrated with trailing edges of serration overlapping a throat area of the first diffuser; and wherein the compressor does not utilize variable inlet guide vanes upstream of the first impeller.

7. The refrigeration system according to claim 6, wherein the second diffuser is a low solidity vaned diffuser, a trailing edge over a leading edge radius ratio of the vanes of the low solidity vaned diffuser is less than 1.2, and wherein a solidity of the low solidity vaned diffuser is less than 0.9.

8. The refrigerant system according to claim 6, wherein the throat area of the first diffuser is a smallest cross-sectional flow passage between the wedge-shaped vanes.

* * * * *